United States Patent
Zhou

(10) Patent No.: US 7,715,832 B2
(45) Date of Patent: May 11, 2010

(54) MOBILE TERMINAL AND A METHOD FOR IMPLEMENTING THE GUARDIANSHIP FUNCTION

(75) Inventor: Ping Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 533 days.

(21) Appl. No.: 11/692,732

(22) Filed: Mar. 28, 2007

(65) Prior Publication Data

US 2007/0197193 A1 Aug. 23, 2007

Related U.S. Application Data

(63) Continuation of application No. PCT/CN2005/001586, filed on Sep. 28, 2005.

(30) Foreign Application Priority Data

Sep. 28, 2004 (CN) .................. 2004 1 0080537

(51) Int. Cl.
H04H 20/71 (2008.01)
H04M 1/66 (2006.01)
H04M 3/00 (2006.01)
H04W 4/00 (2009.01)
H04M 1/00 (2006.01)

(52) U.S. Cl. .............. 455/418; 455/3.03; 455/411; 455/419; 455/420; 455/466; 455/550.1

(58) Field of Classification Search .......... 455/90.1, 455/404.1–404.2, 410–411, 421, 423–425, 455/456.1–456.6, 460, 466, 514, 517, 550.1, 455/556.2, 557–558, 563–565, 2.01, 3.03, 455/67.11, 68, 70, 88, 98, 123, 181.1, 352–353, 455/405, 414.2–414.3, 418–420; 340/539.13, 340/539.15, 573.1

See application file for complete search history.

(56) References Cited

U.S. PATENT DOCUMENTS

| 6,438,393 | B1 * | 8/2002 | Suuronen .................. 455/575 |
| 6,931,236 | B2 | 8/2005 | Kaplan |
| 7,027,588 | B2 | 4/2006 | Coutant |
| 7,158,797 | B1 * | 1/2007 | Jayaraman et al. ....... 455/456.1 |

(Continued)

FOREIGN PATENT DOCUMENTS

CN 1499805 A 5/2004

(Continued)

OTHER PUBLICATIONS

Siemens C25 User Guide, 12-14 (May 1999), XP002267158.

*Primary Examiner*—Meless N Zewdu
(74) *Attorney, Agent, or Firm*—Leydig, Voit & Mayer, Ltd.

(57) ABSTRACT

A mobile terminal with a guardianship function, includes: a first module, configured for collecting data related to use of the mobile terminal; a second module, configured for determining the use of the mobile terminal by analyzing the data collected by the first module; and a third module, configured for sending a short message informing the use of the mobile terminal determined by the second module. A method for performing the guardianship function at a mobile terminal is also provided. By using the mobile terminal and the method, a guardian is able to timely learn a ward's use of the mobile terminal, thus effectively monitoring the ward.

9 Claims, 3 Drawing Sheets

U.S. PATENT DOCUMENTS

| | | | |
|---|---|---|---|
| 7,385,589 B2 * | 6/2008 | Bartels et al. | 345/169 |
| 7,549,947 B2 * | 6/2009 | Hickman et al. | 482/8 |
| 2003/0021424 A1 | 1/2003 | Coutant | |
| 2003/0096580 A1 | 5/2003 | Kaplan | |
| 2004/0029557 A1 | 2/2004 | Pugliese | |
| 2004/0219928 A1 * | 11/2004 | Deeds | 455/456.1 |
| 2005/0040953 A1 | 2/2005 | McDonald | |
| 2005/0070315 A1 * | 3/2005 | Rai et al. | 455/466 |
| 2005/0119020 A1 * | 6/2005 | Cheng et al. | 455/466 |
| 2005/0183143 A1 * | 8/2005 | Anderholm et al. | 726/22 |

FOREIGN PATENT DOCUMENTS

| | | |
|---|---|---|
| CN | 1522043 A | 8/2004 |
| CN | 1531313 A | 9/2004 |
| DE | 196 39 492 A1 | 5/1997 |
| DE | 199 22 862 A1 | 12/2000 |
| DE | 102 35 547 A1 | 10/2003 |
| DE | 20 2004 007960 U1 | 9/2004 |
| EP | 1280328 A2 | 1/2003 |

* cited by examiner

MOBILE TERMINAL AND A METHOD FOR IMPLEMENTING THE GUARDIANSHIP FUNCTION

This application is a continuation of International Patent Application No. PCT/CN2005/001586, filed Sep. 28, 2005, which claims priority to Chinese Patent Application No. 200410080537.X, filed Sep. 28, 2004, all of which are hereby incorporated by reference.

FIELD OF THE INVENTION

The present invention relates to mobile terminal application technologies, and particularly to a mobile terminal with a guardianship function and a method for implementing the guardianship function at the mobile terminal.

BACKGROUND OF THE INVENTION

Currently, various portable mobile terminals become more and more popular. A guardian usually has to equip a ward with a mobile terminal, e.g., a cell phone, so as to conveniently keep touch with the ward who may be a minor, an unconscious aged or any other people unable to make judgment independently. When needing to know the ward's situation or being eager to contact the ward, the guardian has no choice but to call or send a short message to the ward on his own initiative, and sometimes has to do so for so many times. So it is troublesome for the guardian to monitor the ward's use of the mobile terminal.

In addition, the guardian wants the ward to be honest when he makes a phone call or sends a short message to the ward to learn the ward's condition, but quite often things will not turn out the way he wished. For example, parents want to know if their child is playing a game, but usually they cannot get the veracious information from the child by calling him, and cannot remotely control the game function of the portable device of the child. In addition, once one of the following situations occurs, such as the mobile terminal not being in the service area, or having been switched off, or being lack of power supply, usually the guardian cannot learn such situations in advance and will fail to reach the ward, and can not perform the guardianship effectively.

Currently, in order to locate a ward in real time, the ward can be equipped with a Global positioning system (GPS) terminal device, with which the ward can be precisely located. This mechanism can provide a guardianship function, however owing to the high price and too much service charge, the OPS terminal device is not suited for ordinary people and is difficult to be popularized.

SUMMARY

One or more embodiments of the present invention provide a mobile terminal with a guardianship function, so that if a ward is equipped with the mobile terminal, a guardian is able to learn the use of the mobile terminal in real time.

The one or more embodiments of the present invention also provide a method for performing the guardianship function at a mobile terminal so as to enable the guardian to timely learn the ward's use of the mobile terminal.

The technical solution in accordance with the one or more embodiments of the present invention is as follows:

The one or more embodiments of the present invention disclose a mobile terminal, including:

a first module, configured for collecting data related to use of the mobile terminal;

a second module, configured for determining the use of the mobile terminal by analyzing the data collected by the first module; and a third module, configured for sending a short message for informing the use of the mobile terminal determined by the second module.

The one or more embodiments of the present invention also disclose a method for implementing a guardianship function at a mobile terminal, including:

collecting data related to use of the mobile terminal;

analyzing the data and determining the use of the mobile terminal according the analyzing; and sending a short message used for informing the use of the mobile terminal.

Therefore, the mobile terminal with the guardianship function and the method for performing the guardianship function at the mobile terminal according to one or more embodiments of the invention is able to inform the guardian of the ward's use of the mobile terminal as soon as possible, thus timely and accurately implementing the guardianship function.

EMBODIMENTS OF THE INVENTION

Figure 1:
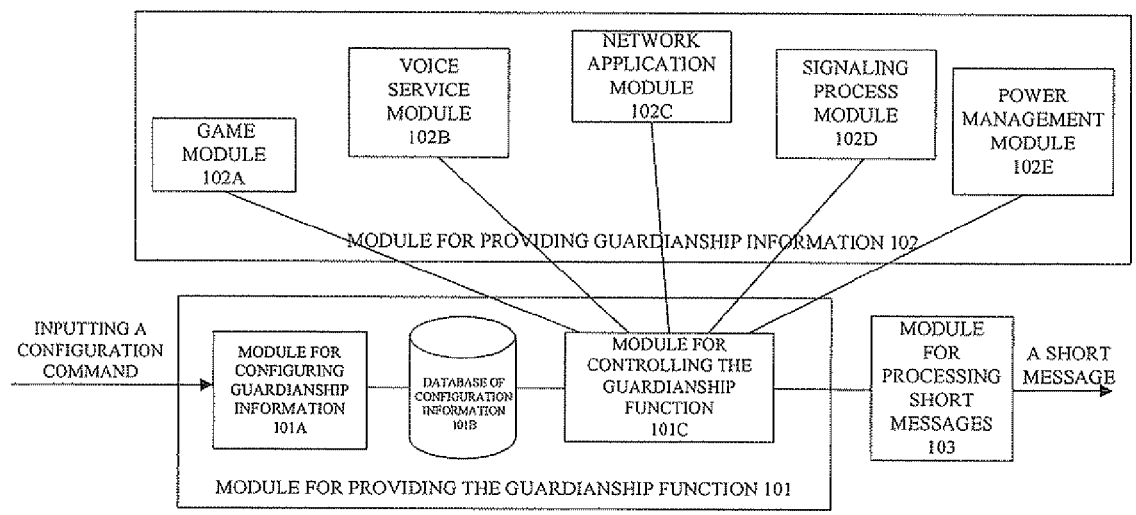
FIG. 1 is a simplified schematic illustrating components and structure of a mobile terminal in an embodiment of the present invention.

A detailed description of the present invention is given hereinafter with reference to the drawings and specific one or more embodiments.

The one or more embodiments of the present invention disclose a mobile terminal with a guardianship function, including a module for providing guardianship information and a module for processing short messages. And the mobile terminal further includes: a module for providing a guardianship function including a module for controlling the guardianship function, which receives a guardianship report from the module for providing guardianship information, analyzes the guardianship report to obtain guardianship information and sends the guardianship information to the module for processing short messages. The module for processing short messages receives the guardianship information and sends a short message containing the guardianship information to a mobile terminal of the guardian.

The module for providing guardianship information and the module for processing short messages may be modules in the existing mobile terminal. The module for providing guardianship information may include: a game module, a voice service module, a network application module, a signaling process module or a power management module, or any combination of the five modules. The module for providing the guardianship function may only contain the module for controlling the guardianship function. In order to flexibly configure guardianship information required by a guardian, the module for providing the guardianship function may further contain: a module for configuring the guardianship information. And to make the module for configuring the guardianship information and the module for controlling the guardianship function relatively being independent from each other, a database of configuration information is connected between the module for configuring the guardianship information and the module for controlling the guardianship function.

In the existing mobile terminal, the game module, the voice service module and the network application module can respectively learn when a user uses the mobile terminal to run a game program, make a call and open a data service application, and can respectively know when the user stops running the game program, ends the call and closes the data service application. The power management module can detect the usage of the power supply in the mobile terminal, and is responsible for turning on/off the power source of the mobile terminal. The module for processing singling is used for exchanging signaling with the network side upon the mobile terminal is being turned on/off, or roaming, or entering a service area, for example, when the user presses a turnoff key, if CPU detects that the turnoff key has been pressed, it instructs the signaling process module to implement the turnoff signaling procedure with the network side, controls the power management module on turning off the power source of the mobile terminal, and thus completes the turnoff procedure of the mobile terminal.

With reference to FIG. 1, a further detailed description is hereinafter given to the components related to the implementation of the guardianship function in the mobile terminal according to the one or more embodiments of the present invention. FIG. 1 is a schematic illustrating the components and structure of a mobile terminal in an embodiment of the present invention. As shown in FIG. 1, the mobile terminal includes: the module for providing a guardianship function 101, the module for providing guardianship information 102 and the module for processing short messages 103. The module for providing the guardianship function 101 includes: the module for configuring guardianship information 101A, the database of configuration information 101B and the module for controlling the guardianship function 101C. The module for providing guardianship information 102 includes: a game module 102A, a voice service module 102B, a network application module 102C, a signaling process module 102D, and a power management module 102E. Since the technical solution discussed herein only relates to the guardianship function at the mobile terminal, in order to give a brief description, the existing components with no relationship to the guardianship function at the mobile terminal have not been shown in FIG. 1.

The module for configuring guardianship information 101A receives a configuration command input by the user, generates guardianship requirements and sends the guardianship requirements to the database of configuration information 101B which is used for saving the guardianship requirements. The module for controlling the guardianship function 101C is used for extracting the guardianship requirements from the database of configuration information 101B, receiving a guardianship report from any of the game module 102A, the voice service module 102B, the network application module 102C, the signaling process module 102D and the power management module 102E, obtaining guardianship information according to the received guardianship requirements and the guardianship report, and sending a guardianship instruction containing the guardianship information to the module for processing short messages 103. The module for processing short messages 103 is used for sending a short message containing the guardianship information to the guardian's mobile terminal according to the guardianship instruction.

When the mobile terminal according to the embodiment of the invention initiates the guardianship function thereof, the operational principle thereof is as follows:

First, the module for configuring guardianship information 101A receives a configuration command input by a user, obtains guardianship requirements from the configuration command, saves the guardianship requirements in the database of configuration information 101B, and outputs the guardianship requirements to the module for controlling the guardianship function 101C. The guardianship requirements may indicate for the module for controlling the guardianship function 101C the number of the guardian's mobile terminal and information that the guardian needs to obtain, e.g., the guardian needs to acquire information related to turn-on/turnoff, opening a data service application, playing games and/or making a call, information related to being of insufficient power source, and information related to roaming and/or entering a service area etc. The guardianship requirements correspond to at least one specific sub-module included in the module for providing guardianship information, and may also be related to at least one specific information item in the received guardianship report.

Second, the module for controlling the guardianship function 101C, according to the guardianship requirements, receives the guardianship report from at least one of the game module 102A, the voice service module 102B, the network application module 102C, the signaling process module 102D, and the power management module 102E, obtains guardianship information according to the guardianship requirements and the guardianship report, and generates a guardianship instruction containing the guardianship information and sends it to the module for processing short messages 103, wherein, the guardianship instruction is to instruct the module for processing short messages 103 to carry what kind of guardianship information in the short message to be sent.

Lastly, the module for processing short messages 103, according to the received guardianship instruction, constructs a short message in a format specified by the standard protocol, takes the guardianship information contained in the guardianship instruction as the content of the short message, takes the guardian's mobile terminal number as a receiver ID of the short message, and eventually sends the short message to the guardian's mobile terminal, thereby notifying the guardian of the guardianship information.

There are two mechanisms for receiving the guardianship requirements at the module for controlling the guardianship function 101C: (a) the module for configuring guardianship information 101A, the database of configuration information 101B, and the module for controlling the guardianship function 101C are started up simultaneously, and the database of configuration information 101B, on receiving the guardianship requirements, directly sends the received information to the module for controlling the guardianship function 101C; (b) the startup of the module for configuring the guardianship information 101A and the database of configuration information 101B is independent of the startup of the module for controlling the guardianship function 101C. The database of configuration information 101B saves the guardianship requirements on receiving it, and the module for controlling the guardianship function 101C reads the guardianship requirements from the database of configuration information 101B after the module for controlling the guardianship function 101C has been started. The two mechanisms mentioned above are only examples of the receiving the guardianship requirements at the module for controlling the guardianship function according to the embodiment of the invention, and the method for receiving the guardianship requirements at the module for controlling the guardianship function is not limited to the two mechanisms. The guardianship requirements may be statically configured, i.e., the module for controlling the guardianship function 101C receives all the guardianship requirements when being started up. Alternatively, it may also be configured dynamically, i.e., after the module for controlling the guardianship function 101C is started up, every time receiving new guardianship requirement, the database of configuration information 101B sends the information newly received to the module for controlling the guardianship function 101C, so that according to the ward's situation, the guardian can dynamically make configuration on which sub-module included in the module for providing guardianship information should be monitored and which information item should be obtained from the guardianship report submitted by the module for providing guardianship information.

In addition, there are also two forms of the guardianship requirements received by the module for controlling the guardianship function 101C: (a) the guardianship requirements received is in the same form as that saved by the database of configuration information 101B; (b) the guardianship requirements received may be the index of the guardianship requirements saved in the database of configuration information, wherein the database of configuration information 101B saves the actual content of the guardianship requirements, and sends the index of the guardianship requirements to the module for controlling the guardianship function 101C which obtains the guardianship requirements from the database of configuration information 101B according to the index of the guardianship requirements when it is to extract the guardianship information indicated by the guardianship requirements and construct a short message. The form of the guardianship requirements sent to the module for controlling the guardianship function 101C is not limited to the above two forms, and no matter what form the guardianship requirements is in, the solution should be covered in the scope of the invention.

The aforementioned module for configuring guardianship information 101A, the database of configuration information 101B, or the module for controlling the guardianship function 101C may be a module set independently in the mobile terminal or may be integrated in one existing module inside the mobile terminal, and any combination of the three modules may also be integrated as one module independently set in the mobile terminal or be integrated in one existing module inside the mobile terminal. The existing module inside the mobile terminal may be: the game module 102A, the voice service module 102B, the network application module 102C, the signaling process module 102D, the power management module 102E or the like. For example, the module for configuring guardianship information 101A may be set independently, and alternatively, it may be integrated with the module for controlling the guardianship function 101C. And the module for configuring the guardianship information 101A may also be integrated in the game module 102A or CPU etc. As there are so many implementation solutions of the module for configuring guardianship information 101A, the database of configuration information 101B, and the module for controlling the guardianship function 101C, all the implementation modes will not be enumerated one by one herein, but they are covered in the scope of the invention.

Based on the above-mentioned mobile terminal, the embodiment of the invention provides a method for implementing the guardianship function at the mobile terminal, including: firstly, the module for providing the guardianship function receiving a guardianship report from the module for providing guardianship information; secondly, the module for providing the guardianship function generating guardianship information according to the guardianship report, and sending the guardianship information to the module for processing short messages; and lastly, the module for processing short messages sending a short message containing the guardianship information to the guardian's mobile terminal.

In order to send guardianship information at the mobile terminal as required by the guardian, the module for providing the guardianship function may further receive a configuration demand from an I/O module of the mobile terminal, obtain guardianship requirements from the configuration demand, determine at least one sub-module included in the module for providing guardianship information corresponding to the guardianship requirements, and configure an interface between the module for providing the guardianship function and the determined at least one sub-modules so as to receive the guardianship report from the determined at least one sub-modules. The guardianship requirements may be related to the specific contents of the guardianship information, e.g., corresponding to the specific information items in the guardianship report from a sub-module, therefore, it is necessary to further determine the specific information item in the received guardianship report corresponding to the guardianship requirements, and extract the guardianship information needed by the guardian according to the guardianship requirements from the received guardianship report. For this reason, the module for providing guardianship information may obtain the guardianship information according to the received guardianship report and the guardianship requirements.

The module for providing guardianship information may include: a game module, a voice service module, a network application module, a signaling process module, or a power management module, or any combination of these five modules; these modules may be called the sub-module of the module for providing guardianship information. If the guardianship requirements require that information related to turn-on, turnoff: roaming and/or entering a service area should be sent, the module for providing guardianship information at least includes the signaling process module which sends a guardianship report to the module for providing the guardianship function after completing the signaling procedure of turn-on/turnoff with the network side, or determines whether the mobile terminal is roaming and/or entering a service area by analyzing the message from the network side. If the guardianship requirements indicate that the information about being of insufficient power supply should be sent, the module for providing guardianship information at least includes the power management module, which sends a guardianship report to the module for providing the guardianship function when finding that the power supply of the mobile terminal is about to be exhausted. And if the guardianship requirements require of sending information related to opening a data service application, playing games and/or making a call, respectively, the module for providing guardianship information at least includes the network application module, the game module, and/or the voice service module, wherein, the network application module, the game module, and/or the voice service module sends a guardianship report to the module for providing the guardianship function respectively upon the mobile terminal starts opening a data service application, playing games and/or making the call, and/or the mobile terminal closes the data service application, stops playing games, and/or ending the call.

Since the problem to be solved by the embodiment of the present invention is how to construct a short message according to the use of a mobile terminal and send the short message to the guardian's mobile terminal, and it is not related to a special case of failing to send such information as the short message due to a bad signal condition, so it is supposed in the embodiment that the mobile terminal is able to communicate with the network side successfully, and the guardian's mobile terminal has been turned on, i.e., the ward's mobile terminal can successfully complete the turnoff signaling procedure and send a short message to the guardian's mobile terminal.

Figure 2:
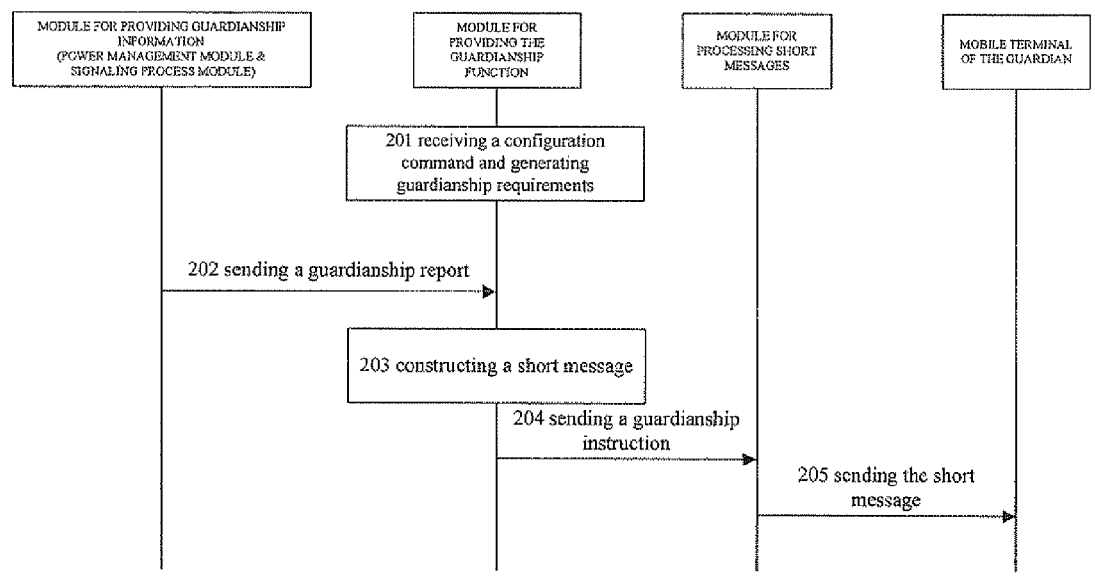
FIG. 2 is a simplified flow chart illustrating the processing in an embodiment of the present invention.

Detailed descriptions of the method in accordance with the embodiment of the invention are hereinafter given in a case that the module for providing guardianship information includes the signaling process module and/or the power management module. The guardianship information may include information related to turn-on, turnoff: roaming, entering a service area, or being of insufficient power supply, or any combination of the five kinds of information. FIG. 2 is a flow chart illustrating the processing in an embodiment of the present invention. As shown in FIG. 2, the processing includes the following processes:

Step 201: the module for providing the guardianship function receives a configuration command, generates guardianship requirements according to the configuration command, and based on the guardianship requirements, configures an interface with at least one sub-module included in the module for providing guardianship information to acquire the guardianship report.

The user has to input a password so as to edit the configuration command, and, on having input the configuration command, the user has to input another password so as to modify the saved guardianship requirements.

Basically, the module for providing the guardianship function may receive the configuration command in two manners: (a) the module for providing the guardianship function receives the configuration command only when being started up, and generates static guardianship requirements and saves it; (b) after being started up, the module for providing the guardianship function, in real time, receives the configuration command, generates the guardianship requirements and updates the guardianship requirements saved in local.

Step 202: the module for providing guardianship information sends a guardianship report to the module for providing the guardianship function.

If the guardianship requirements require of sending information related to turn-on, turnoff, roaming and/or entering a service area, the module for providing the guardianship function configures an interface with the signaling process module, In the case of the mobile terminal being turn-on, turnoff, roaming and/or entering the service area, the signaling process module sends a guardianship report to the module for providing the guardianship function. If the guardianship requirements require of sending information related to being of insufficient power supply, the module for providing the guardianship function configures an interface with the power management module, and in the case of the mobile terminal being of insufficient power supply, the power management module sends a guardianship report to the module for providing the guardianship function. In addition, when the mobile terminal is turning off, it is needed to send the guardianship information for indicating the turnoff of the mobile terminal before the power source is turned off. So if the guardianship requirements require of sending the guardianship information for indicating the turnoff of the mobile terminal, the module for providing the guardianship function further configures an interface with the power management module in order to make the power management module turning off the power source after the guardianship information for indicating the turnoff of the mobile terminal has been successfully sent to the guardian's mobile terminal.

Step 203: the module for providing the guardianship function constructs a short message containing guardianship information according to the analysis result of the guardianship report and the guardianship requirements.

The analysis result of the guardianship report may be that: the report indicates that the mobile terminal is turn-on, turn-off: of insufficient power supply, roaming and/or entering a service area, wherein, the module for providing the guardianship function will extract the corresponding guardianship information from the guardianship requirements, e.g., "turn-on", "turnoff", "insufficient power supply", "roaming", and "entering a service area" etc. Then, the module for providing the guardianship function takes the extracted guardianship information as the contents of the short message, takes the guardian's mobile terminal number as a receiver ID of the short message, and constructs the short message in a format specified in the standard protocol. Details about how the guardianship information is edited and how the short message is constructed will not be described here, which can be implemented according to the prior art.

Step 204: the module for providing the guardianship function generates a guardianship instruction, contains in the guardianship instruction the constructed short message, and sends the guardianship instruction to the module for processing short messages.

In Steps 203 to 204, the short message may be constructed by the module for processing short messages, wherein, the module for providing the guardianship function extracts the guardianship information from the guardianship requirements according to the analysis result of the guardianship report, and sends the guardianship instruction containing the guardianship information to the module for processing short messages which then constructs a short message containing the guardianship information in the manner mentioned above according to the guardianship instruction and sends the short message. The guardianship information contained in the guardianship instruction may be contents of the guardianship information; and alternatively, it may be an ID indicating the address of the contents of the guardianship information wherein the module for processing short messages obtains the contents of the guardianship information according to the ID and contains the contents in the constructed short message. The guardianship information can be extracted from the guardianship requirements and the contents of the guardianship information can be obtained via multiple modes which are not limited to the above two modes.

Step 205: the module for processing short messages sends the short message to the guardian's mobile terminal according to the receiver ID of the short message included in the guardianship instruction, i.e., the guardian's mobile terminal number, and the sending the short message is a process well known in the art which will not be described in detail herein.

If the guardian asks to monitor the turnoff of the mobile terminal, when the mobile terminal is about to be turned off, the signaling process module submits a guardianship report indicating the turnoff to the module for providing the guardianship function, and the module for providing the guardianship function sends to the guardian's mobile terminal a short message for indicating the mobile terminal being turned off via the module for processing short messages. The module for processing short messages returns a success acknowledgement to the module for providing the guardianship function after successfully sending the short message, and on receiving the success acknowledgement, the module for providing the guardianship function sends an instruction for turning off the power source to the power management module to inform that the local mobile terminal should be turned off. Thus, before turnoff, the mobile terminal can complete the sending of the short message for indicating turnoff, and can turn off the power source after successfully sending the short message, and thus the whole turnoff procedure is completed.

It can be seen from the above that the ward's mobile terminal can be instructed to send a short message to the guardian's mobile terminal in the case of turn-on, turnoff, roaming, entering a service area and/or being of insufficient power supply by inputting a configuration command, thereby the guardian can learn these cases of the ward as soon as possible and easily to monitor the use of the ward's mobile terminal.

It is well known that, for lack of self-control, the ward's immoderately playing games, opening a data service application or making the call at the mobile terminal will seriously influence his study and daily life, so the guardian needs a guardianship mechanism capable of monitoring the above cases occurring at the ward's mobile terminal. If the guardian needs to know whether the ward is playing games, opening a data service application, and/or making the call, the procedure as illustrated in FIG. 2 can be adopted to send to the ward information related to playing games, opening a data service application, and/or making the call, wherein the guardianship requirements require of sending information related to playing games, opening a data service application, or making the call, or any combination of the three kinds of information; and respectively, the nodule for providing guardianship information at least includes: the network application module, the game module, or the voice service module, or any combination of the three modules. The contents of the guardianship information corresponding to the guardianship requirements may further include text contents to be sent via the short message, the text contents are pre-edited via the configuration command from the user, e.g., the text contents may be edited as "starting opening a data service application/playing games/making a call" and "stopping opening a data service application/playing games/making the call" etc.

Figure 3:
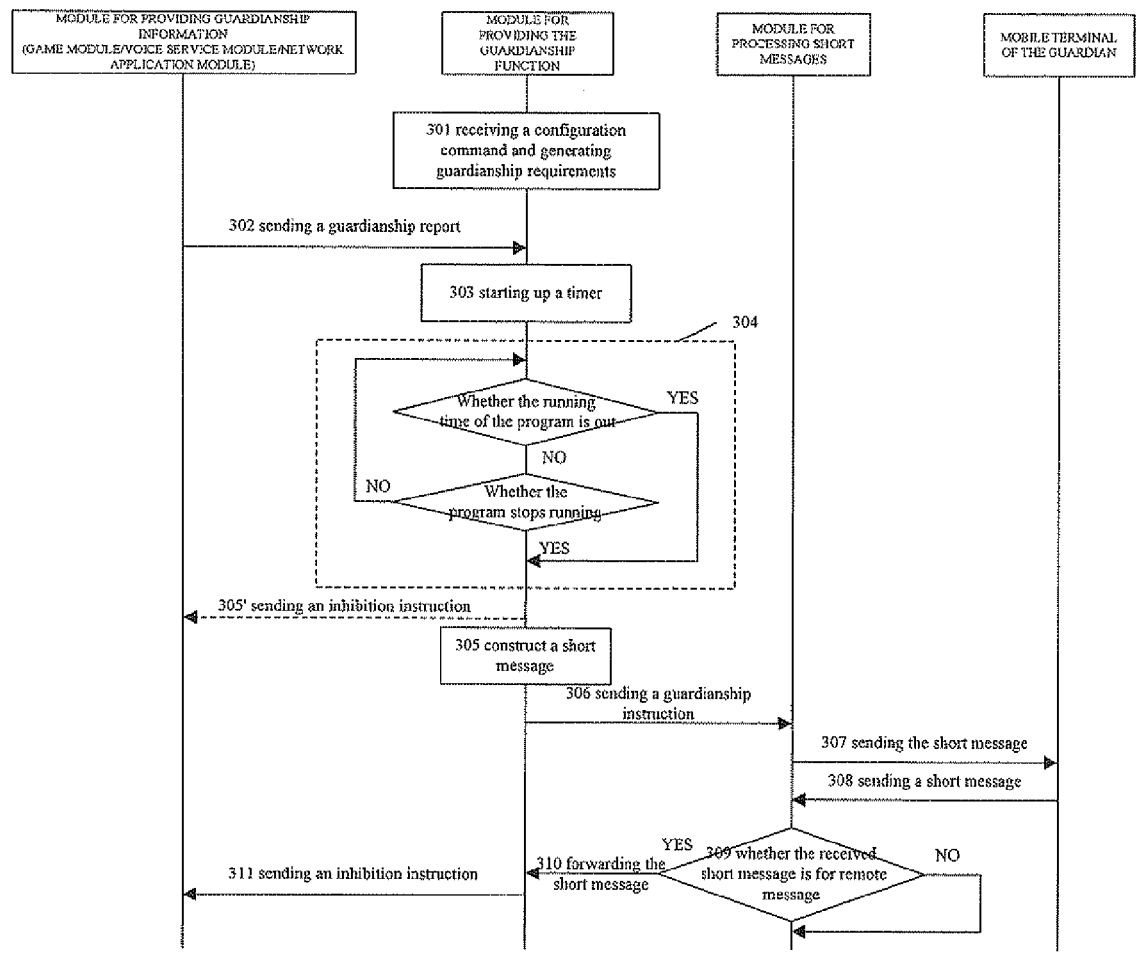
FIG. 3 is a simplified flow chart illustrating the processing in an embodiment of the present invention.

Besides whether the ward is playing games, making a call and/or opening a data service application, the guardian needs to know the time of the ward's playing games, making the call and/or opening a data service application so as to remind the ward to stop playing games, making the call and/or opening a data service application at an appropriate time. Therefore, a timer can be set in the module for providing the guardianship function, or set in the network application module, the game module or the voice module in the mobile terminal illustrated in FIG. 2, and the timer works when the mobile terminal begins to play games, make a call or open a data service application, and respectively, stops working as soon as the mobile terminal stops playing games, making the call or opening the data service application. So that the ward's mobile terminal can send a short message containing the running time of a program related to playing games, making the call or opening the data service application to the guardian's mobile terminal. In addition, a threshold for limiting the running time of the program may be set in the timer to send a short message to the guardian in the case of the running time of the program related to playing games, making the call or opening the data service application being out of the threshold. Detailed descriptions with reference to FIG. 3 are hereinafter given to the guardianship mechanism in which a timer is set, As shown in FIG. 3, the processing is as follows:

Step 301: the module for providing the guardianship function receives a configuration command, generates guardianship requirements according to the configuration command, determines at least one sub-module included in the module for providing guardianship information, and configures an interface for the determined sub-module to acquire a guardianship report, the at least one sub-module corresponding to the guardianship requirements. The guardianship requirements may indicate which guardianship information should be sent and a threshold for limiting the running time of the program related to playing games, making the call or opening the data service application etc. The threshold may be input via the configuration command from the user, e.g., the threshold for limiting the running time of the program related to playing games can be configured as 30 minutes. Three thresholds respectively for limiting the running time of the program related to playing games, making the call and opening the data service application may be identical or any two of the thresholds may be different.

Step 302: when the mobile terminal starts to play games, make a call and/or open a data service application, the module for providing guardianship information, i.e., the game module, the voice service module and/or the network application module, sends to the module for providing guardianship function a guardianship report indicating that the program starts to run.

Step 303: the module for providing the guardianship function analyzes the received guardianship report, determines that the mobile terminal starts to run the program related to playing games, making the call and/or opening the data service application, and then initiates the timer.

Step 304: the module for providing the guardianship function determines whether the running time of the program related to playing games, making the call or opening the data service application is out of the threshold. If the running time is out of the threshold, the module for providing the guardianship function performs Step 305, and otherwise, determines whether a guardianship report indicates that the program related to playing games, making the call or opening the data service application stops running has been received. The module for providing the guardianship function stops the timer and performs Step 305 if such a guardianship report has been received, and continues to perform Step 304 if such a guardianship report has not been received.

The timer may be initiated by the module for providing guardianship information, the threshold for limiting the running time of the program may be configured in the module for providing guardianship information via a configuration command from the user, and there are various modes of the configuration which are not limited to the modes mentioned in the embodiment of the present invention. In Step 302, when the mobile terminal starts to play games, make a call and/or open a data service application, the module for providing guardianship information, i.e., the game module, the voice service module and/or the network application, starts the timer while sending to the module for providing the guardianship function the guardianship report indicating that the program related to playing games, making the call and/or opening the data service application starts to run. In this case, Step 304 is that: the module for providing the guardianship function determines whether the running time of the program related to playing games, making the call or opening the data service application is out of the threshold, if the running time is out of the threshold, sends to the module for providing the guardianship function a guardianship report indicating the running time of the program being out of the threshold, and performs Step 305. And otherwise, the module for providing the guardianship function determines whether the program related to playing games, making the call and/or opening the data service application stops running, if the program does stop running, terminates the timing of the timer and sends to the module for providing the guardianship function a guardianship report containing the timing result of the timer and indicating that the program has stopped running, and performs Step 305; and if the program does not stop running, the module for providing the Guardianship function continues to perform Step 304.

Step 305: the module for providing the guardianship function generates guardianship information based on the guardianship requirements according to the analysis result of the guardianship report. And the module for providing the guardianship function takes the guardianship information as contents of a short message to be sent, takes the guardian's mobile terminal number as a receiver ID of the short message, and constructs the short message in the format specified in the standard protocol.

The guardianship report includes: a guardianship report indicating that the program starts running, a guardianship report indicating that the program stops running, and a guardianship report indicating that the running time of the program is out. And the analysis result of the guardianship report may be the mobile terminal starting to play games, make a call and/or open a data service application, or the mobile terminal stopping playing games, making the call and/or opening the data service application, or the running time of playing games, making the call, and/or opening the data service application being out. If the guardianship report indicating that the program starts or stops running has been received, the guardianship information will respectively indicate that the program starts or stops running, and the guardianship information may respectively be: "start to play games/make a call/open a data service application" or "stops playing games/making the call/opening the data service application" etc. If the guardianship report indicating that the running time of the program is out has been received wherein the timer is initiated by the module for providing guardianship information, the guardianship information will indicate that the running time of the program is out, and the guardianship information may be "the running time of the program related to playing games/making the call/opening the data service application is out" etc. In addition, if the guardianship report indicating that the program stops running has been received, the timing result of the timer may also be included in the guardianship information to form the contents of the short message, e.g., "opening a data service application for 10 minutes" etc. If the timer is initiated by the module for providing guardianship information, the timing result of the timer may be contained in the guardianship report indicating that the program stops running; and if the timer is initiated by the module for providing the guardianship function, the timing result of the timer may be saved in the module for providing the guardianship function.

Steps 306-307: the module for providing the guardianship function generates a guardianship instruction, includes the constructed short message in the guardianship instruction and sends the guardianship instruction to the module for processing short messages. The module for processing short messages sends the short message to the guardian's mobile terminal according to the receiver ID of the short message, i.e., the guardian's mobile terminal number, the receiver ID being included in the guardianship instruction.

When the mobile terminal sends an ordinary short message, such information as "in process of sending" and "success in sending" will be displayed on the user interface in order not to affect the program currently running when the mobile terminal sends the short message to the guardian and not to display any information related to the sending of such short message on the user interface when the mobile terminal is sending the short message including the guardian information. That is, when the ward's mobile terminal is sending the guardianship information to the guardian's mobile terminal via a short message, the sending of the guardianship information should not be known by the ward, and it should not affect the visual experience of the current service for the wards. The details for the implementation of the above solution are well known for the skilled in the art which will not be further described herein.

In the above-mentioned processing shown in FIG. 3, the mobile terminal can via the short message sends to the guardian the information indicating that the ward starts to play games, make a call and/or open a data service application, or indicating that indicating that the ward stops playing games, making the call and/or opening the data service application, or indicating that indicating that the running time of the program related to playing games, making the call and/or opening the data service application is out, or the running time of the program related to playing games, making the call and/or opening the data service application, so that the guardian can properly know how the ward is using the mobile terminal. For this reason, the function for controlling the network application module, the game module and/or the voice service module is added to the mobile terminal in accordance with the embodiment of this invention, the controlling including a local mechanism and a remote control mechanism.

In the local control mechanism, if the timer is initiated by the module for providing the guardianship function, when the running time of the program in the module for providing the guardianship information is out, i.e., the timing result of the timer is out of the threshold, Step 305 is performed as follows: the module for providing the guardianship function sending to the module for providing guardianship information an inhibition instruction indicating that the module for providing guardianship information should stop running the program, and the module for providing guardianship information stops running the program on receipt of the inhibition instruction. For example, upon the running time of a game program is out, the game module will receive a prohibition instruction and stop the game program. And if the timer is initiated by the module for providing guardianship information, when the running time of the program in the module for providing the guardianship information is out, i.e., the timing result of the timer is out of the threshold, the module for providing guardianship information automatically stops running the program.

In the remote control mechanism, on receipt of the short message mentioned in Step 307, the guardian selects whether to perform the remote control and which function of the module for providing guardianship information should be controlled according to the contents indicated by the short message, and performs the following processes:

Step 308: The guardian's mobile terminal sends a short message to the guardian's mobile terminal, the short message being received by the module for processing short messages at the ward's mobile terminal. The short message includes: a password for indicating that the short message is used for the remote control (this kind of short message can be called a remote control message) and a field for controlling the module for providing guardianship information, the field being used for indicating which sub-module included in the module for providing guardianship information should be controlled. The password may be set in the module for processing short messages via a configuration command from the user, and the field for controlling the module for providing guardianship information may be edited by the user's inputting the configuration command. And the guardianship requirements obtained by the module for providing the guardianship function according to the configuration command includes: the password and the field for controlling the module for providing guardianship information.

Step 309: the module for processing short messages determines whether the short message is a remote control message according to the password saved in local, if it is the remote control message, performs Step 310; and otherwise, it is determined that the short message is an ordinary short message, and the module for processing short messages make a ordinary process for the short message, and ends the current processing.

Step 310: the module for processing short messages forwards the remote control message to the module for providing the guardianship function.

Step 311: the module for providing the guardianship function analyzes the short message, identifies the field for controlling the module for providing guardianship information, determines the sub-module included in the module for providing guardianship information according to the field and sends an inhibition instruction to the determined sub-module to make the module for providing guardianship information stop running the program. For example, the field for controlling the module for providing guardianship information in the short message indicates that the function of the game module should be controlled, and the module for providing the guardianship function sends an inhibition instruction to the game module which will stop the game program on receipt of the inhibition instruction.

In addition, the receiving the configuration command and generating guardianship requirements in Steps 201 and 301 is relatively independent of the receiving the guardianship report in Steps 202 and 302, i.e., the configuration command may first be input to configure the interface between the module for providing the guardianship function and the module for providing guardianship information, but not always, the guardianship function is initiated and starts to receive the guardianship report at the same time. In the embodiment of the invention, the guardianship function in the module for providing the guardianship function may be activated by a command from a module for processing key-press on the mobile terminal, or be activated via a remote activating mode. If the guardianship function is activated via the remote activating mode, a password used for the remote control is input via a configuration command, the password indicating that the guardianship function should be activated, and similar to Steps 308-310, the guardian sends a short message containing the password used for the remote control to the ward's mobile terminal, and on receiving the short message, the module for providing the guardianship function at the ward's mobile terminal identifies the password, activates the guardianship function thereof, and starts to receive the guardianship report.

The processing in FIG. 2 is mainly with regard to the guardianship information related to the cases of being turn-on, being turnoff, being of insufficient power supply, roaming, and/or entering a service area, while the processing in FIG. 3 is mainly with regard to the guardianship information related to the cases of playing games, making a call and/or opening the data service application. In practice, the guardianship information may include information related to any one or any combination of the eight cases of being turn-on, being turnoff, being of insufficient power supply, roaming, entering a service area, playing games, making a call and opening a data service application. Therefore, the processing in FIG. 2 can be combined with that in FIG. 3 to implement the guardianship function for the ward, i.e., in the cases of being turn-on, being turnoff, being of insufficient power supply, roaming, and/or entering a service area, the processing in FIG. 2 can be adopted while in the cases of playing games, making a call and/or opening a data service application, the processing in FIG. 3 can be implemented.

Moreover, after performing the guardianship function described above, the mobile terminal may be of many other valuable functions. For example, the mobile terminal may have a theft protection function, wherein, in the case of being stolen, the guardian can learn the state of the stolen mobile terminal via a short message as long as the mobile terminal is in the state of turn-on, turnoff or roaming etc., so as to timely prevent the thief from using the mobile terminal by sending a remote control message.

In view of the above, by using the mobile terminal and the method provided by the embodiment in accordance with the invention, the guardian is enabled to timely learn the ward's use of the mobile terminal, thereby effectively monitoring the ward's activity. For example, in the case of the mobile terminal being of insufficient power supply, the guardian can send a short message to notify the guardian's mobile terminal as soon as possible, so that, the guardian can timely touch the ward to learn the location and situation thereof, or determine other communication methods. Besides, the guardian can timely learn the use of the mobile terminal such as playing games, making a call and/or opening a data service application, and can freely set a threshold for limiting the running time of the program related to playing games, making a call and/or opening a data service application, so that when the running time of the program related to playing games, making the call and/or opening the data service application is out, the guardian can timely inhibit the corresponding function modules on the mobile terminal from running, thereby conveniently controlling the ward's excessively playing games, making a call and/or opening a data service application. It can be seen that the mobile terminal and the method is particularly suitable for parents to monitor their children's use of the mobile terminal. Therefore, the mobile terminal with the guardianship function and the method for implementing the guardianship function provided by the embodiment of the invention can effectively guard the ward and fully satisfies the guardian's guardianship requirements.

The foregoing descriptions are only one or more embodiments of the present invention and are not for use in limiting the protection scope thereof. Any modification, equivalent replacement or improvement made under the spirit and principles of the present invention is included in the protection scope of the claims of the present invention.

What is claimed is:

1. A mobile terminal, comprising:
   a first module, configured for collecting data related to use of the mobile terminal;
   a second module, configured for determining the use of the mobile terminal by analyzing the data collected by the first module; and
   a third module, configured for sending a short message for informing the use of the mobile terminal determined by the second module;
   wherein:
   the first module further comprises a timer configured for calculating a running time of a program of the mobile terminal and transmitting the running time of the program to the third module via the second module, and a determination module configured for determining whether the running time of the program is out of a threshold and notifying the third module via the second module when the running time of the program is out of the threshold; and the third module is further configured for sending the short message for informing of the running time of the program being out when the running time of the program is out of the threshold.

2. The mobile terminal of claim 1, wherein, the first module is further configured for stopping running the program when the running time of the program is out of the threshold.

3. A mobile terminal, comprising:
a first module, configured for collecting data related to use of the mobile terminal;
a second module, configured for determining the use of the mobile terminal by analyzing the data collected by the first module;
a third module, configured for sending a short message for informing the use of the mobile terminal determined by the second module;
wherein:
the second module further comprises: a timer configured for calculating a running time of a program of the mobile terminal and transmitting the running time of the program to the third module via the second module, and a determination module configured for determining whether the running time of the program is out of a threshold and notifying the third module via the second module when the running time of the program is out of the threshold; and
the third module is further configured for sending the short message for informing of the running time of the program being out when the running time of the program is out of the threshold.

4. The mobile terminal of claim 3, wherein, when the running time of the program is out of the threshold, the determination module is further configured for notifying the first module; and
the first module is further configured for stopping running the program when being notified.

5. A method for implementing a guardianship function at a mobile terminal, the mobile terminal including memory and processing hardware, the method comprising:
collecting data by the processing hardware from the memory related to use of the mobile terminal;
analyzing the data by the processing hardware and determining the use of the mobile terminal according the analyzing;
sending a short message from the mobile terminal for detailing the determined use of the mobile terminal;
calculating a running time of a program at the mobile terminal, wherein, the short message further carries the running time of the program; and
wherein the short message is to identify when the running time of the program exceeds a predetermined threshold.

6. The method of claim 5, further comprising: stopping running the program when the running time exceeds the predetermined threshold.

7. A method for implementing a guardianship function at a mobile terminal having processing hardware and memory, comprising:
collecting data by the processing hardware related to use of the mobile terminal;
analyzing the data by the processing hardware and determining the use of the mobile terminal according the analyzing; and
sending a short message from the mobile terminal used for notifying the determined use of the mobile terminal;
receiving at the mobile terminal a remote control message for indicating that a running of at least one program at the mobile terminal should be stopped; and
stopping the running of the at least one program according to the remote control message.

8. The method of claim 7, further comprising:
identifying whether the short message received contains a predefined password, and when the short message received contains a predefined password, determining the short message received is the remote control message.

9. The method of claim 7, wherein, the use of the mobile terminal comprises any one or any combination of the followings: playing games, opening a data service application and making a call.

\* \* \* \* \*